(12) United States Patent
Imoto

(10) Patent No.: US 7,634,199 B2
(45) Date of Patent: *Dec. 15, 2009

(54) OPTICAL COMMUNICATION SYSTEM AND OPTICAL TRANSMITTING APPARATUS FOR THE SAME

(75) Inventor: Noriyuki Imoto, Tama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/071,768

(22) Filed: Feb. 26, 2008

(65) Prior Publication Data

US 2008/0159749 A1 Jul. 3, 2008

Related U.S. Application Data

(62) Division of application No. 11/434,259, filed on May 16, 2006.

(30) Foreign Application Priority Data

May 17, 2005 (JP) ............... 2005-143575

(51) Int. Cl.
*H04B 10/00* (2006.01)
(52) U.S. Cl. .................................... 398/159
(58) Field of Classification Search ............... 398/158, 398/192
See application file for complete search history.

(56) References Cited

U.S. PATENT DOCUMENTS

| | | | |
|---|---|---|---|
| 4,813,045 A | | 3/1989 | Culpepper |
| 5,453,868 A | * | 9/1995 | Blauvelt et al. ............. 398/199 |
| 5,598,288 A | | 1/1997 | Collar |
| 5,930,024 A | * | 7/1999 | Atlas ........................ 359/279 |
| 5,933,265 A | | 8/1999 | Nagarajan |
| 6,813,448 B1 | * | 11/2004 | Chiappetta .................. 398/158 |
| 7,095,960 B2 | * | 8/2006 | Quesenberry et al. ....... 398/115 |
| 7,127,182 B2 | * | 10/2006 | Matthews et al. ........... 398/183 |

(Continued)

FOREIGN PATENT DOCUMENTS

GB 2 426 880 A 12/2006

(Continued)

OTHER PUBLICATIONS

U.K. Search Report, dated Aug. 24, 2006.

(Continued)

*Primary Examiner*—Shi K Li
(74) *Attorney, Agent, or Firm*—Finnegan, Henderson, Farabow, Garrett & Dunner, L.L.P.

(57) ABSTRACT

An optical communication system includes an optical transmission apparatus and an optical receiving apparatus. The optical transmission apparatus includes an input port to receive an electric signal, a noise generator to generate noise, a transmission signal generator to generate a transmission signal by multiplexing the noise with the electric signal, and an electric/optical converter to convert the transmission signal into an optical signal and send out the optical signal to an optical transmission path. The optical receiving apparatus connected to the optical transmission apparatus via the optical transmission path and receiving the optical signal through the optical transmission path. The optical receiving apparatus includes an optical/electric converter to convert the optical signal received through the optical transmission path into a receive electric signal and a receiving filter to remove the noise from the receive electric signal.

10 Claims, 5 Drawing Sheets

U.S. PATENT DOCUMENTS

| | | |
|---|---|---|
| 2004/0028414 A1 | 2/2004 | Quesenberry et al. |
| 2004/0156643 A1 | 8/2004 | Frederiksen et al. |
| 2004/0156673 A1 | 8/2004 | Huessler |

FOREIGN PATENT DOCUMENTS

| | | |
|---|---|---|
| JP | 58-3431 | 1/1983 |
| JP | 2001-177474 A | 6/2001 |
| JP | 3295029 | 4/2002 |
| WO | WO 02/30012 A2 | 4/2002 |

OTHER PUBLICATIONS

U.K. Examination Report dated Jun. 1, 2007.
Corrected U.K. Search Report, dated Aug. 24, 2006.

\* cited by examiner

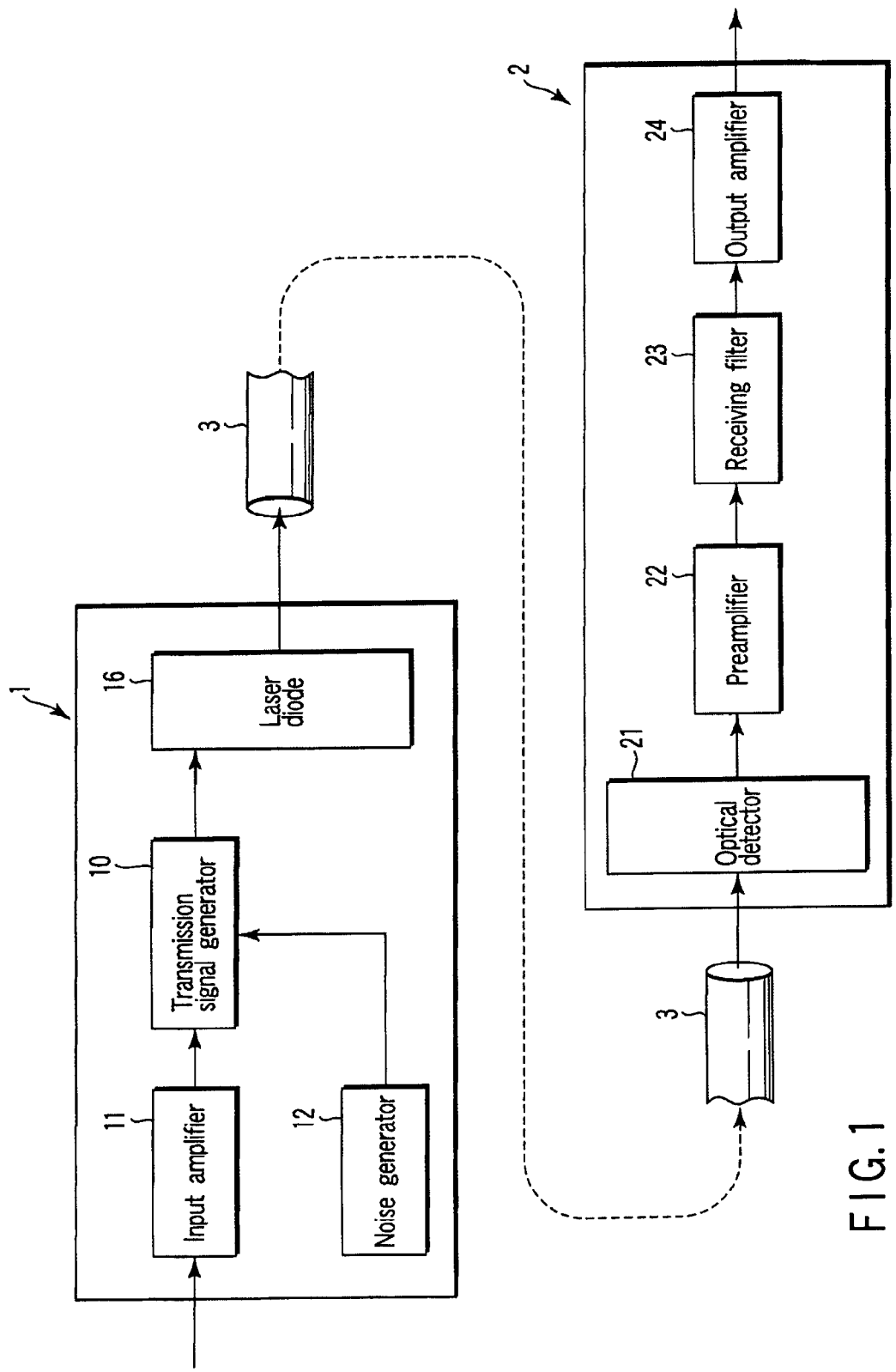
F I G. 1

OPTICAL COMMUNICATION SYSTEM AND OPTICAL TRANSMITTING APPARATUS FOR THE SAME

CROSS-REFERENCE TO RELATED APPLICATIONS

This is a divisional application of application Ser. No. 11/434,259, filed May 16, 2006, and, is based upon and claims the benefit of priority from prior Japanese Patent Application No. 2005-143575, filed May 17, 2005, all of which are incorporated here by reference.

BACKGROUND OF THE INVENTION

1. Field of the Invention

The present invention relates to an optical communication system and an optical transmitting apparatus used for this optical communication system. In particular, the present invention relates to an optical communication system that transmits an optical signal having undergone analog intensity modulation, through an optical transmission path.

2. Description of the Related Art

A technique to transmit an optical signal, which has undergone optical intensity modulation by a broadband and ultra-high frequency electric signal, through an optical fiber is widely applied for mobile phone systems. Generally, the coverage area of a base station of a mobile phone system is 1 to 3 km in radius. As the number of mobile phone terminals increase along with the popularization of mobile phones, a compact base station with a narrow coverage area is being introduced. The compact base station is not provided with an exchange function or a traffic control function. The compact base station is a head end radio apparatus, which is established in subordination to a usual base station or a center apparatus and so forth.

The base station converts a carrier signal into an optical signal, which is then transmitted to the compact base station through an optical fiber. The compact base station demodulates the received optical signal to obtain a carrier signal and emits the carrier signal from its antenna. The compact base station converts a carrier signal received by the antenna to an optical signal, which is then transmitted to the base station through the optical fiber. A carrier signal is fundamentally a radio frequency signal transmitted/received by the antenna of a base station.

The compact base station can be downsized in since the compact base station only has to subject the optical signal to direct intensity modulation by a carrier signal. For this reason, the compact base stations are set up behind buildings or various spots in downtown areas where access frequently occurs. Compact base stations are also used to extend the service area of the base station to, such as, rural areas and colonies distant from urban areas.

Meanwhile, when the intensity of an optical signal transmitted/received between the base station and the compact base station is large (for instance, +7 dbm or more), stimulated brillouin scattering occurs in the optical fiber. The stimulated brillouin scattering generates noise and distortion in the transmission optical signal. To address this issue, Japanese Patent No. 3295029 discloses a technique to multiplex a sub-carrier signal and the main signal of a transmission optical signal.

As mentioned above, Japanese Patent No. 3295029 discloses a technique to prevent deterioration of transmission quality by multiplexing a sub-carrier signal and a main signal to be transmitted. However, this technique requires an oscillating circuit of high stability for generating the sub-carrier signal. In addition, the frequency of the sub-carrier signal must be set at a frequency in which the harmonic component of sub-carrier signal does not affect the carrier signal, which is the main signal. Moreover, the frequency of the sub-carrier signal must be set at a frequency by which intermodulation does not occur in the frequency band of carrier signal between the sub-carrier signal and the carrier signal. As explained, with the conventional art as described in Japanese Patent No. 3295029, there is a problem that the circuitry becomes larger and the control regulation becomes complicated.

BRIEF SUMMARY OF THE INVENTION

An object of the present invention is to provide an optical communication system and an optical transmission apparatus for the same, which are able to transmit an optical signal in high quality, by suppressing noise and distortion caused by stimulated brillouin scattering without complexifying or increasing the scale of circuitry.

An aspect of the present invention provides an optical communication system comprising: an optical transmission apparatus comprising: an input port to receive an electric signal; a noise generator to generate noise; a transmission signal generator to generate a transmission signal by multiplexing the noise with the electric signal; and an electric/optical converter to convert the transmission signal into an optical signal and send out the optical signal to an optical transmission path; and an optical receiving apparatus connected to the optical transmission apparatus via the optical transmission path and receiving the optical signal through the optical transmission path, the optical receiving apparatus comprising: an optical/electric converter to convert the optical signal received through the optical transmission path into a receive electric signal; and a receiving filter to remove the noise from the receive electric signal.

By taking such measures, a noise is multiplexed with an electric signal to be transmitted. This noise can be generated easily, for example, by simply applying a voltage to a diode. For this reason, a noise or distortion component resulting from stimulated brillouin scattering can be controlled without requiring a grand structure or complicated control as in a highly stable oscillating circuit for generating a sub-carrier signal.

According to this invention, an optical communication system and an optical transmission apparatus for the same, which are able to transmit an optical signal in high quality, can be provided by suppressing noise or distortion resulting from stimulated brillouin scattering without complexifying or increasing the scale of circuitry.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram of an optical communication system according to a first embodiment of the present invention.

DETAILED DESCRIPTION OF THE INVENTION

Figure 2:
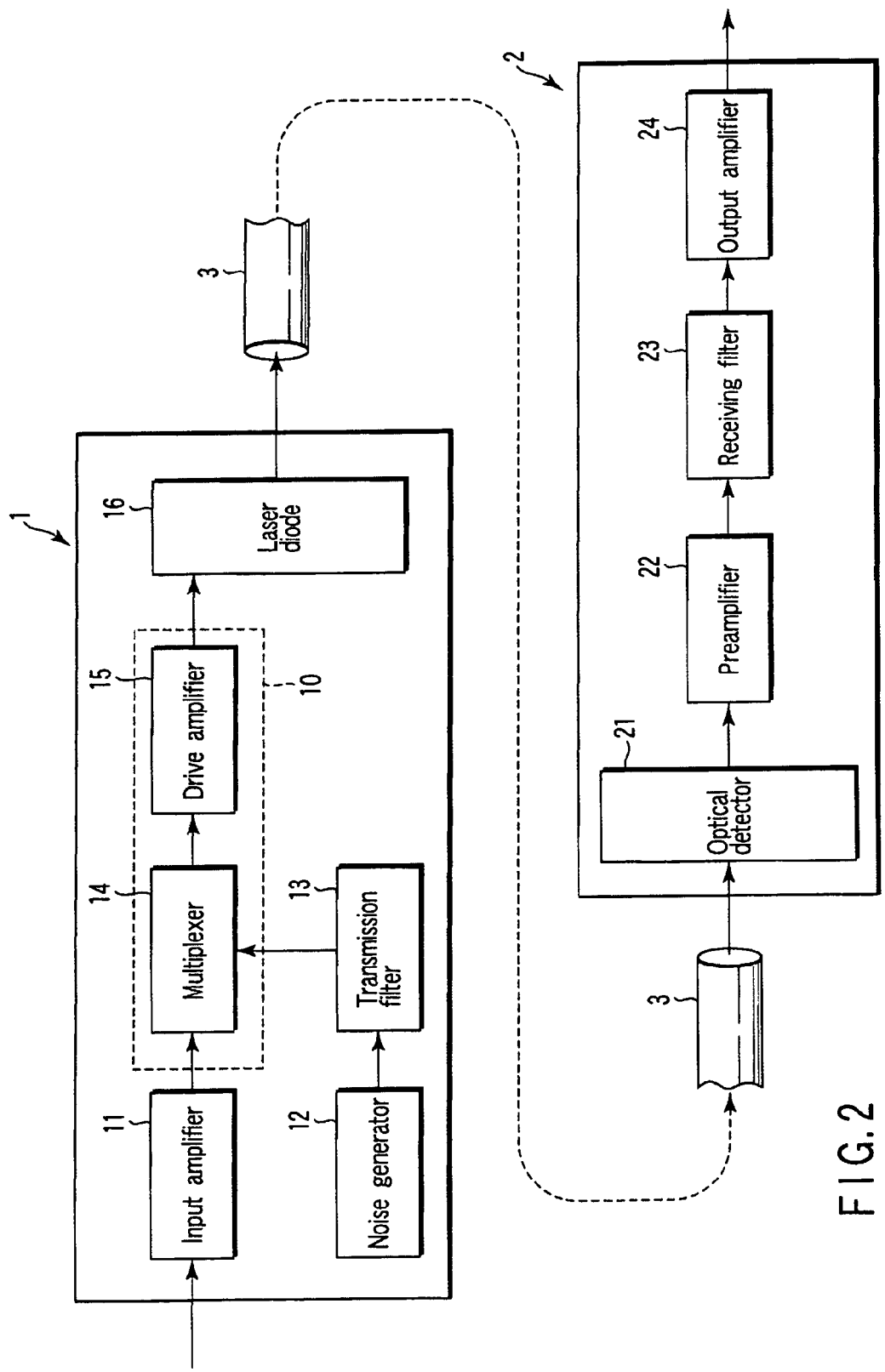
FIG. 2 is a block diagram of an optical communication system according to a second embodiment of the present invention.

Embodiments of the present invention will be explained in detail with reference to the drawings.

First Embodiment

FIG. 1 is a functional block diagram of an optical communication system according to the first embodiment of the present invention.

In FIG. 1, the optical communication system comprises an optical transmission apparatus 1 and an optical receiving apparatus 2, which is connected to the optical transmission apparatus 1 though an optical fiber 3. The optical transmission apparatus 1 comprises a transmission signal generator 10, an input amplifier 11, a noise generator 12 and a laser diode 16. The optical receiving apparatus 2 comprises an optical detector 21, a preamplifier 22, a receiving filter 23 and an output amplifier 24.

This system is set up to support mobile communication systems including, for example, mobile phone networks, and extends the service area of the base station by using the optical fiber 3. On the downlink, an optical signal transmitted from the optical transmission apparatus 1 of the base station is received with the optical receiving apparatus 2 of the compact base station. Normally, a two-way communication is carried out on the uplink and downlink. Therefore, the base station and the compact base station each comprise the optical transmission apparatus 1 and the optical receiving apparatus 2. In the present embodiment to follow, the case of a downlink will be explained as an example.

For example, let's say that a 1.5 GHz carrier signal is transmitted from the base station to the compact base station. When a carrier signal arrives at the optical transmission apparatus 1, the input amplifier 11 amplifies the input carrier signal to a required level and outputs an amplified carrier signal. The noise generator 12, for example, applies a voltage to a diode in order to generate white noise. The white noise is noise distributed in substantially uniform spectrum intensity over a range from the baseband frequency to a frequency higher than the frequency band of the carrier signal. The output level of this white noise is set to an acceptable level smaller than the spectrum intensity of the carrier signal.

The white noise output from the noise generator 12 is input to the transmission signal generator 10. The transmission signal generator 10 generates a transmission signal by multiplexing the white noise and the carrier signal output from the input amplifier 11. Further, the transmission signal generator 10 amplifies this transmission signal and drives the laser diode 16 by an amplified transmission signal to make it oscillate and emit a laser beam therefrom. The laser beam is transmitted to the optical fiber 3 as an optical signal.

The optical signal multiplexed with this white noise arrives at the optical receiving apparatus 2 through the optical fiber 3. The optical detector 21 converts the input optical signal into an electric signal, which is then amplified with the preamplifier 22 and input to the receiving filter 23. The receiving filter 23 allows only the frequency band of a carrier signal of the input electric signal to pass through, whereby the carrier signal is extracted from the electric signal. The carrier signal is input to the output amplifier 24 to be reproduced thereby.

As mentioned above, in the first embodiment, the optical transmission apparatus 1 generates the transmission signal by multiplexing the white noise output by the noise generator 12 and the carrier signal and converting the transmission signal into the optical signal to transmit the optical signal through the optical fiber 3. The optical receiving apparatus 2 converts the optical signal into the electric signal and reproduces the carrier signal by extracting only the frequency band of the carrier signal from this electric signal by the filter 23.

Since the spectrum intensity of the frequency band of the carrier signal is larger than that of the white noise, the carrier signal can be reproduced at the receiving side. Furthermore, white noise existing outside the frequency band of the carrier signal is able to suppress the influence from the stimulated brillouin scattering generated, for example, at the edge of the optical fiber 3. Thus, according to the first embodiment, an optical signal can be transmitted in high quality by controlling the generation of noise and distortion, which is caused by the stimulated brillouin scattering, without complexifying or increasing the scale of the circuitry.

Second Embodiment

The second embodiment of the present invention will be explained. FIG. 2 is a block diagram of an optical communication system according to the second embodiment of the present invention. In the second embodiment, like reference numerals are used to designate like structural elements corresponding to those like in the first embodiment and any further explanation is omitted for brevity's sake. As illustrated, the optical transmission apparatus 1 further comprises a transmission filter 13 in addition to the input amplifier 11, the transmission signal generator 10, the noise generator 12 and the laser diode 16. Furthermore, the transmission signal generator 10 comprises a multiplexer 14 and a drive amplifier 15.

The transmission filter 13 has a suppressing characteristic in the frequency band (for instance, an occupied bandwidth of 10 MHz) of a carrier signal. The white noise output from the noise generator 12 is input to the multiplexer 14 through this transmission filter 13. In such manner, the noise component of the frequency band of the carrier signal is removed from the white noise. The multiplexer 14 multiplexes the white noise from which the noise component of the frequency band of the carrier signal has been removed and the carrier signal and generates a transmission signal.

Figure 3:
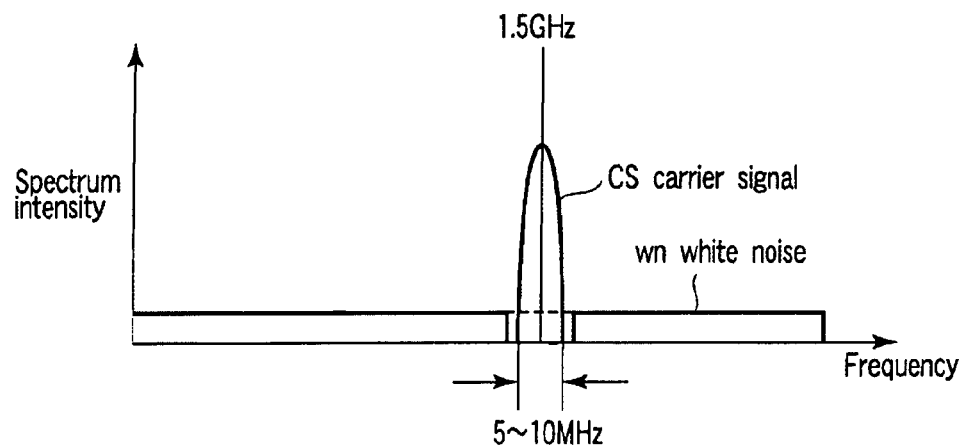
FIG. 3 illustrates a frequency spectrum of a transmission signal to be transmitted to an optical fiber.

FIG. 3 illustrates a frequency spectrum of a transmission signal to be transmitted to an optical fiber 3. In FIG. 3, the frequency of carrier signal CS is extremely high as, for example, 1.5 GHz. The bandwidth of the carrier signal CS is about 5 to 10 MHz. The white noise wn has a frequency component over a range from the baseband to a frequency higher than that of the carrier signal CS. From the white noise is removed a spectrum component of the frequency band of the carrier signal with the transmission filter 13. This white noise wn from which the spectrum component has been removed is multiplexed with the carrier signal CS to generate the transmission signal. The multiplexer 14 inputs the transmission signal generated in such manner to the drive amplifier 15. The drive amplifier 15 amplifies the input transmission signal and drives the laser diode 16 by the amplified input transmission signal.

As described above in the second embodiment, the optical transmission apparatus 1 further comprises a transmission filter 13 for removing the noise component of the frequency band of the carrier signal from the white noise, in addition to the first embodiment. Accordingly, when the white noise wn passed through the transmission filter 13 is multiplexed with the carrier signal, deterioration of communication quality caused by brillouin scattering can be suppressed by the white noise wn outside the carrier signal frequency band without disturbing the original communication. Further, since the noise component is not leaked into the carrier signal frequency band, it is suppressed that the S/N ratio with respect to the carrier signal output from the optical receiving apparatus 2 is deteriorated by white noise.

Third Embodiment

The third embodiment of the present invention will be explained in reference to the functional block diagram of FIG. 2 used for explaining the second embodiment. In the third embodiment, the transmission filter 13 has a passing characteristic in a frequency band different from that of a carrier signal.

Figure 4:
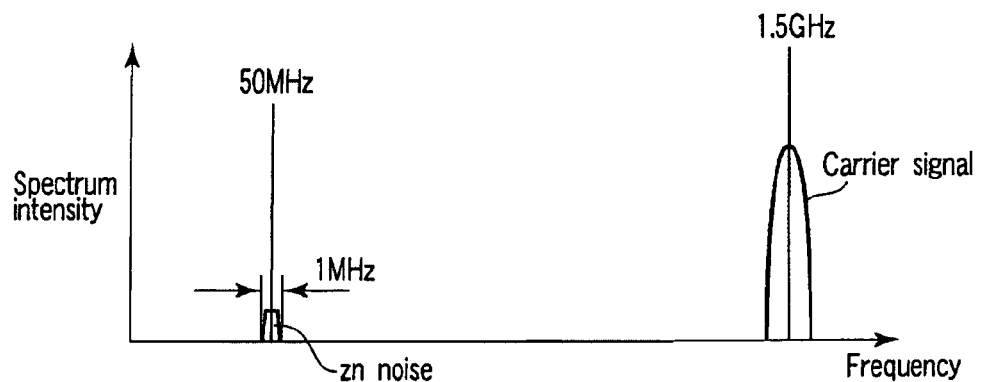
FIG. 4 illustrates a frequency spectrum of a transmission signal to be transmitted to an optical fiber.

FIG. 4 illustrates a frequency spectrum of a transmission signal to be transmitted to an optical fiber 3. The transmission filter 13 comprises for instance a band-pass filter having a passing characteristic over a bandwidth of 1 MHz centering around 50 MHz, which is lower than the frequency band of a carrier signal. As illustrated in FIG. 4, the multiplexer 14 generates the transmission signal by multiplexing a noise component of a given frequency band passed through the transmission filter 13 on a carrier signal.

In the third embodiment, noise zn to be multiplexed with the carrier signal is restricted to only the noise component of bandwidth 1 MHz centered around 50 MHz. Also in this manner, noise and distortion generated by stimulated brillouin scattering can be reduced by noise zn, which exists in a frequency band different from the carrier signal. Further, in comparison to the second embodiment, as the noise component leaked into the frequency band of the carrier signal is further reduced, it can be suppressed that S/N ratio deterioration caused due to the noise zn influences the carrier signal.

In addition, the frequency and bandwidth of the transmission filter 13 passing through the noise component are not restricted to the values described in the above third embodiment. Alternatively, the transmission filter 13 can be arranged to possess a plurality of passing bands different from the frequency band of the carrier signal.

Figure 5A:
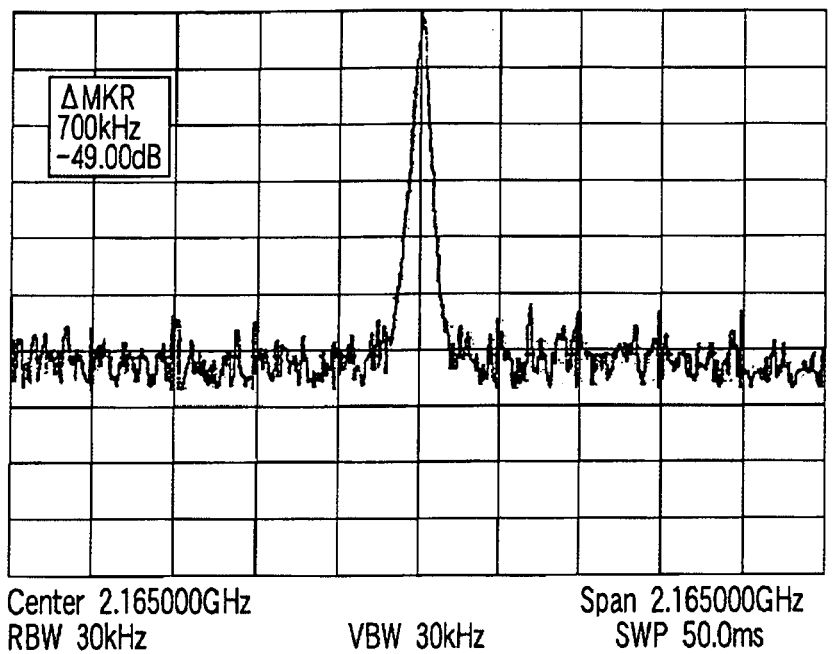
FIG. 5A is spectrum observation result in the case where noise is not multiplexed with a carrier signal.
Figure 5B:
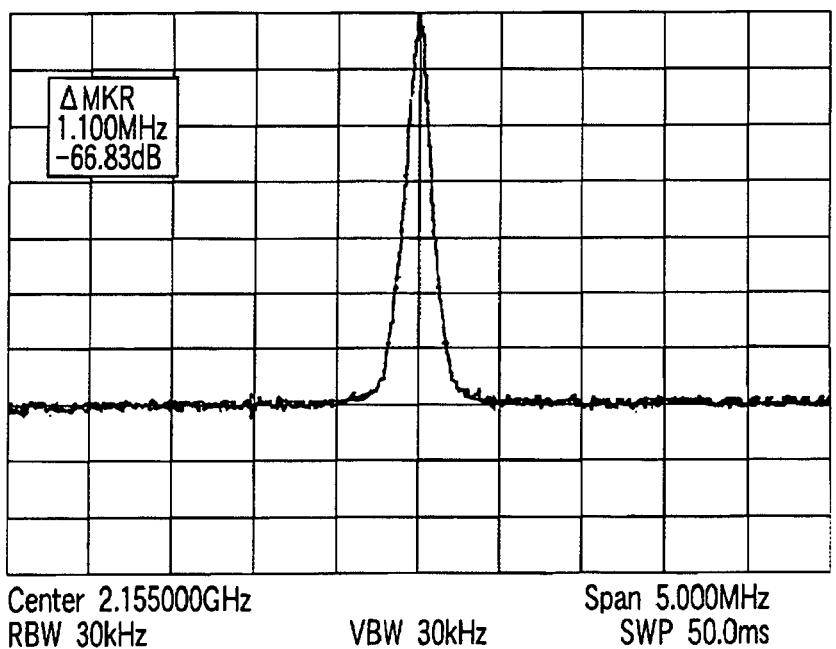
FIG. 5B is spectrum observation result in the case where noise is multiplexed with a carrier signal.

FIGS. 5A and 5B are spectrum observations comparing results of multiplexing noise and not multiplexing noise with a carrier signal when transmitting a carrier signal in a bandwidth of approximately 5 MHz and a center frequency of approximately 2.2 GHz to an optical fiber length of approximately 20 km. FIG. 5A shows observation result in the case where noise is not multiplexed. FIG. 5B shows observation result in the case where noise is multiplexed at a peak level lower or equal to approximately 10 dB against the carrier signal level when setting the noise center frequency to 50 MHz and the noise bandwidth to 10 MHz. As a result of multiplexing noise, D/U ratio (Desired to Undesired Ratio) has improved from 49 dB to 67 dB.

Fourth Embodiment

Figure 6:
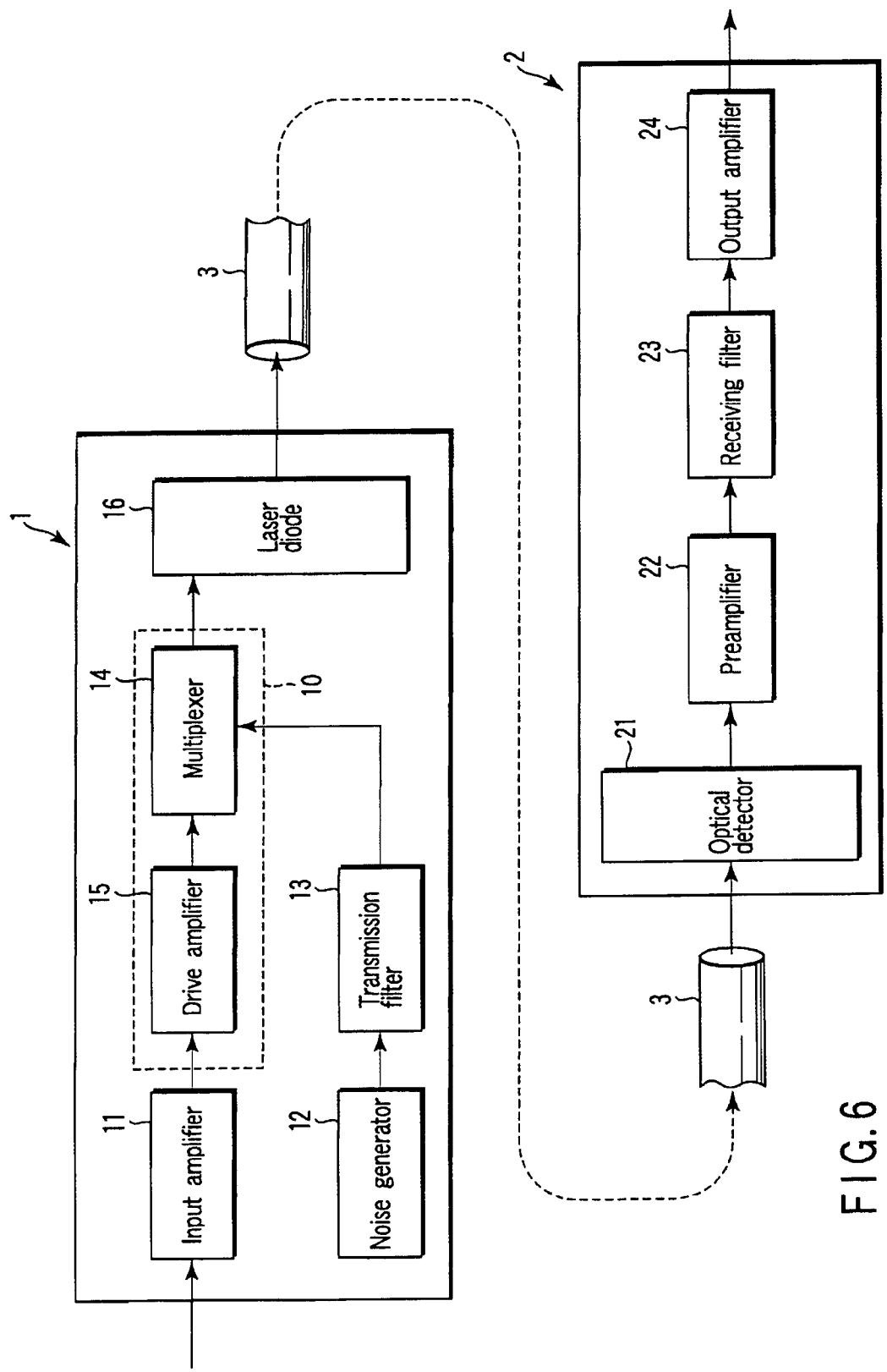
FIG. 6 is a block diagram of an optical communication system according to a forth embodiment of the present invention.

The fourth embodiment of the present invention will be explained. FIG. 6 is a block diagram of an optical communication system according to the fourth embodiment of the present invention. Likewise FIG. 3, the transmission signal generator 10 comprises a multiplexer 14 and a drive amplifier 15. However, in this embodiment, white noise is multiplexed with the carrier signal amplified by the drive amplifier 15. Even in this way, the influence of stimulated brillouin scattering generated, for instance, at the edge of optical fiber 3 is suppressed with the white noise, which exists outside the frequency band of the carrier signal, resulting in making it possible to transmit an optical signal in high quality.

In each of the above embodiments, the optical transmission apparatus 1 multiplexes white noise instead of a sub-carrier signal with the carrier signal. Since the white noise can be generated easily by applying a voltage to the diode, control of stability and so forth is unnecessary. Accordingly, an optical communication system and an optical transmission apparatus for the same that can transmit an optical signal in high quality can be provided by controlling noise and distortion components generated by stimulated brillouin scattering, without increasing the scale of circuitry.

Meanwhile, in each embodiment above, an example of application on a mobile phone system has been explained. However, this can also be applied to, for example, a DSRC (Dedicated Short Range Communication) system, which transmits a signal to a radio station installed on the roadside.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical communication system comprising:
   an optical transmission apparatus comprising:
      an input port to receive an electric signal with a frequency band;
      a noise generator to generate noise;
      a transmission filter configured to receive the noise and filter a noise portion from the noise, wherein the noise portion is of a frequency band that is lower than the frequency band of the electric signal, and wherein the noise portion includes a center frequency of 50 MHz;
      a transmission signal generator comprising a multiplexer to multiplex the noise portion with the electric signal to generate a transmission signal;
      an electric/optical converter to convert the transmission signal into an optical signal and send out the optical signal to an optical transmission path; and
   an optical receiving apparatus connected to the optical transmission apparatus via the optical transmission path and receiving the optical signal through the optical transmission path, the optical receiving apparatus comprising:
      an optical/electric converter to convert the optical signal received through the optical transmission path into a receive electric signal; and
      a receiving filter to remove the noise from the received electric signal.

2. The optical communication system according to claim 1, wherein the transmission signal generator comprises a drive amplifier to amplify the transmission signal of the multiplexer.

3. The optical communication system according to claim 1, wherein the transmission signal generator comprises a drive amplifier to amplify the electric signal and wherein the multiplexer is arranged to multiplex the noise portion and the amplified electric signal to generate the transmission signal.

4. An optical communication system according to any of claims 1-3, wherein the intensity of the noise signal is less than the spectrum intensity of the electric signal.

5. The optical communication system according to claim 1, wherein the noise generator is arranged to generate white noise.

6. An optical transmission apparatus used for an optical communication system in which an optical signal modulated by an electric signal with a frequency band is transmitted via an optical transmission path, the optical transmission apparatus comprising:

a noise generator to generate noise;

a transmission filter configured to receive the noise and filter a noise portion from the noise, wherein the noise portion is of a frequency band that is lower than the frequency band of the electric signal, and wherein the noise portion includes a center frequency of 50 MHz;

a transmission signal generator comprising a multiplexer to multiplex the noise portion and the electric signal to generate a transmission signal; and an electric/optical converter to convert the transmission signal into the optical signal and send out the optical signal to the optical transmission path.

7. The optical transmission apparatus according to claim 6, wherein the transmission signal generator comprises a drive amplifier to amplify the transmission signal of the multiplexer.

8. The optical transmission apparatus according to claim 6, wherein the transmission signal generator comprises a drive amplifier to amplify the electric signal, and wherein the multiplexer is arranged to multiplex the noise portion and the amplified electric signal to generate the transmission signal.

9. An optical transmission apparatus according to any one of claims 6-8, wherein the intensity of the noise is less than the spectrum intensity of the electric signal.

10. The optical transmission apparatus according to claim 6, wherein the noise generator is arranged to generate white noise.

* * * * *